US008406418B2

(12) United States Patent
Birch

(10) Patent No.: US 8,406,418 B2
(45) Date of Patent: Mar. 26, 2013

(54) HEADSET WITH A 360 DEGREES ROTATABLE MICROPHONE BOOM AND FUNCTION SELECTOR

(75) Inventor: Ole Birch, Naerum (DK)

(73) Assignee: GN Netcom A/S (DK)

( * ) Notice: Subject to any disclaimer, the term of this patent is extended or adjusted under 35 U.S.C. 154(b) by 110 days.

(21) Appl. No.: 13/089,853

(22) Filed: Apr. 19, 2011

(65) Prior Publication Data

US 2011/0228925 A1  Sep. 22, 2011

Related U.S. Application Data

(63) Continuation-in-part of application No. 13/124,290, filed as application No. PCT/DK2009/050270 on Oct. 13, 2009.

(30) Foreign Application Priority Data

Oct. 17, 2008 (EP) ..................................... 08018229

(51) Int. Cl.
*H04M 1/00* (2006.01)
*H04M 9/00* (2006.01)
*H04R 25/00* (2006.01)

(52) U.S. Cl. ...................... 379/430; 381/370; 455/575.2

(58) Field of Classification Search .................... 381/74, 381/370, 374–379, 384; 379/428.02, 430; 455/575.1, 575.2, 569.1
See application file for complete search history.

(56) References Cited

U.S. PATENT DOCUMENTS

| 3,445,597 | A | | 5/1969 | Walters |
| 5,690,498 | A | | 11/1997 | Sobhani |
| 5,960,094 | A | * | 9/1999 | Jensen et al. ................... 381/381 |
| 6,097,809 | A | * | 8/2000 | Lucey et al. ................... 379/430 |
| 7,181,037 | B2 | * | 2/2007 | Birch ............................. 381/375 |
| 2004/0171303 | A1 | | 9/2004 | Kubisch |
| 2005/0154593 | A1 | * | 7/2005 | Denatale ....................... 704/275 |
| 2007/0004236 | A1 | | 1/2007 | Suenaga |
| 2007/0286403 | A1 | * | 12/2007 | Gram et al. ................... 379/395 |

FOREIGN PATENT DOCUMENTS

WO    WO 00/07176    2/2000

* cited by examiner

*Primary Examiner* — Tuan D Nguyen
(74) *Attorney, Agent, or Firm* — Altera Law Group, LLC

(57) ABSTRACT

A headset and method for voice communication comprising a housing (2) and a pickup unit (8) rotatably connected to the housing via a joint (7). The pickup unit (8) transmits its position to circuitry which in turn enables functions according to its position. When the unit is moved to a predetermined position and a function is enabled, the user is preferably notified by an audible signal in the earphone. The unit may be rotated, pivoted or twisted and even ratcheted to various positions to engage different functions, such as mute, volume up/down, activate Bluetooth® link etc. One position detection includes a sliding contact (20, 70) mutually rotatable about a rotational axis (26) and a annular ring (50) arranged so that the ring (50) is positioned around the rotational axis (26) so as to provide an electrical connection between the first annular ring (50) and the contact members (30).

20 Claims, 6 Drawing Sheets

HEADSET WITH A 360 DEGREES ROTATABLE MICROPHONE BOOM AND FUNCTION SELECTOR

TECHNICAL FIELD

The present disclosure relates to a headset for voice communication comprising a housing and a pickup unit rotatably connected to the housing via a joint and a position sensor coupled to at least one function.

BACKGROUND ART

It is well known to provide a headset for voice communication with a microphone on a microphone boom that is rotatably mounted to the remaining parts of the headset via a joint. To establish an electrical connection to the microphone from the electrical circuit in the headset, a set of wires are commonly run through the joint. In order to protect these wires from damage due to twisting, arising from rotation of the joint, a mechanical stop is typically included to restrict rotation. Such a mechanical stop then acts to limit the travel of the joint to less than a full revolution or to less than 360 degrees. However, failure of the mechanical stop is a common cause for malfunction of headsets, as such stops may simply break off. Furthermore, the mechanical stop makes it more cumbersome for a headset user to change the microphone position, e.g. when switching from one ear to the other.

It is known to provide a headset with a sliding contact comprising a jack and a jack socket, e.g. from U.S. Pat. No. 3,445,597 and EP 1 478 207. However, this solution is space consuming and difficult to integrate with an electronic circuit in the headset housing. Furthermore, the solution is detrimental to the audio quality of the signal transmitted over the sliding contact.

SUMMARY

It is an object of the disclosure to obtain a new headset, which overcomes or ameliorates at least one of the disadvantages of the prior art or which provides a useful alternative.

According to a first aspect of the disclosure, the headset for voice communication comprises a housing and a pickup unit rotatably connected to the housing via a joint. The pickup unit comprises at least a first microphone, which is electrically connected via at least a first electric connection to an electronic circuit for processing signals from the first microphone. The electronic circuit is arranged in the housing. The first electric connection comprises a first sliding contact, which comprises a housing side and a microphone side. The two sides are mutually rotatable about a rotational axis. One of the housing side or the microphone side of the sliding contact comprises a first annular ring arranged so that the ring is positioned around the rotational axis. The other of the housing side or the microphone side comprises a number of contact members arranged in a radial distance from the rotational axis so as to provide an electrical connection between the first annular ring and the contact members. Providing a sliding electrical connection between the headset housing and the pickup unit eliminates the need for running wires for connection of the microphone to the electronic circuit through the joint. According to the objective of the disclosure, this overcomes the problems with such wires, by achieving a headset that improves user ergonomics, while maintaining a good sound quality of the audio signal transmitted from the microphone to the electrical circuit. Particularly, it eliminates the need for introducing a rotation stop in the joint to prevent wires from becoming twisted. Therefore, the resulting joint may be rotated 360 degrees, or even complete multiple rotations. As known in the art, the headset may comprise a secondary housing which comprises a second loudspeaker. In this case, the housing and the secondary housing may be connected by a headband, a neckband, or other suitable means of connection. The annular ring, of course, needs to be made of an electrically conductive material.

Processing of signals may, e.g., be any one or more of a digital signal processing, an analogue signal processing, active filtering, or passive filtering.

According to a first embodiment, the radial distance is substantially equal to a radius of the annular ring so that the contact members contact a ring face of the annular ring. Alternatively, the radial distance may be slightly larger than the radius so that the contact members contact the annular ring on an outer periphery thereof.

In another embodiment, the annular ring is arranged in a first plane, and the contact members are arranged in a second plane adjacent to or in a distance from the first plane.

In a particular embodiment, both the first plane and the second plane are arranged substantially normal to the rotational axis.

In a further embodiment, the contact members are adapted to extend from the second plane in direction towards the first plane.

According to another embodiment of the disclosure, the pickup unit comprises or consists of a microphone boom. However, the pickup unit may take many forms and may comprise additional components besides e.g. a microphone.

According to a further embodiment, the microphone side or the housing side of the sliding contact further comprises at least a second annular ring, and the other of the housing side or the microphone side comprises a number of second contact members arranged in a radial distance from the rotational axis so as to provide a second electrical connection between the second annular ring and the second contact members. Thus, the microphone, first, and second electrical connection form a circuit that is connected to the electronic circuit in the housing.

In an embodiment, the first annular ring and the second annular ring are arranged concentrically around the rotational axis. In this configuration, a particularly efficient geometry is realized, since the annular rings may be minimized in size. If the sliding contact is provided with even more annular rings, these may naturally also be arranged concentrically around the rotational axis.

In another embodiment, two or more contact members are electrically connected in parallel for providing parallel electrical connections between the first annular ring and contact members. If only one contact member is used per connection, variations in resistance will lead to introduction of noise in the audio signal transmitted over the connection. This problem may be resolved by using two or more contact members, connected in parallel. Likewise, any further annular rings that the sliding contact may have, may also have two or more contact members corresponding to each additional annular ring for providing parallel electrical connections between the annular rings and the contact members.

In a preferred embodiment, the contact members are arranged in such a way that under rotation of the sliding contact, at least a first and a second contact member, which are connected in parallel, extend from the second plane towards the first plane at oblique angles. The first contact member extends in the direction of rotation, and the second contact member extends opposite to the direction of rotation. By arranging the two contact members to extend in opposite directions around the rotational axis, one contact member is always pulled along the annular ring while another is always pushed, regardless of the direction of rotation. This helps to improve the quality of the electrical connection, since a contact member that is pushed along the annular ring may skip, thus breaking the connection, while a contact member that is pulled along is better adapted to maintain connection.

In an additional embodiment of the disclosure, either one or more of the first annular ring or the contact members comprise gold surfaces, at least in a region where the first annular ring and the contact members come in contact. Changes, e.g. oxidization, in the surfaces of the first annular ring and/or the contact members where they may come in contact have detrimental effects on the sound quality of the audio signal transmitted over the connection, since such changes may cause variations in the resistance of the connection, as the joint is rotated. By providing gold surfaces on the first annular ring and/or the contact members, at least in regions where they may come in contact, minimizes the influence from such changes in the surface, resulting in smaller signal variations and thus a better sound quality. Such gold surfaces may be achieved, e.g. by plating a metallic surface with gold. Alternatively, they may be made entirely in gold. Analogously, if the sliding contact comprises more than one annular ring, such additional rings and/or corresponding contact members may also comprise gold surfaces.

According to an embodiment, the contact members are resiliently biased or spring-loaded towards the first annular ring. Thus, the contact members may yield as the joint is rotated which minimizes wear of the annular ring and the contact members. In case the sliding contact comprises more annular rings than the first annular ring, the corresponding contact members may also be made resiliently biased or spring-loaded towards the additional annular rings.

According to a further embodiment, the contact members are arranged on a contact wheel, which is mechanically engaged with either the pickup unit or the housing. In this way, the assembly of the headset is simplified, since the electrical connection from the microphone or the electronic circuit may simply be soldered to the contact members. After soldering, the contact wheel may be fixed to the pickup unit or the housing. As a further advantage of this embodiment of the disclosure, multiple models of headsets may be adapted to accept one shape of contact wheel, leading to a rationalization of production. If the sliding contact is arranged with more than one annular ring, the additional contact members that are to correspond with such additional rings may also be arranged on the contact wheel.

In one embodiment, the contact wheel is formed in a polymer material. Polymer materials may easily be formed and are thus well suited for inexpensive production of parts in large volume, leading to a lower overall cost of manufacturing.

In a particular embodiment, the contact wheel may be unitarily formed.

In an additional embodiment, the contact members are moulded into the contact wheel. Preassembly of the contact wheel and the contact members makes for a particularly efficient assembly of the headset, since fewer parts are needed for this assembly step. The moulding of the contact members into the contact wheel is a task suitable for a large degree of automation, thus lowering production cost.

In another embodiment, the first annular ring is provided on a printed circuit board (PCB). By forming the first annular ring directly on a PCB, a particularly compact sliding contact is realized. Furthermore, assembly of the headset is simplified, since fewer parts need to be mounted.

In a particular embodiment of the disclosure, the first annular ring is provided on a printed circuit board which also carries a substantial part of the components that make up the electronic circuit for processing signals from the first microphone. According to this embodiment, the sliding contact may be integrated directly with the electronic circuit, thus further reducing the number of parts that need to be mounted during assembly. Naturally, any additional annular rings comprised in the sliding contact may also be provided on a PCB.

In a further embodiment, the pickup unit comprises at least a second microphone, and wherein the housing side or the microphone side of the sliding contact comprises at least one additional annular ring, and wherein the other of the microphone side or the housing side of the sliding contact comprises a number of additional contact members so as to provide an electrical connection between the additional annular ring and the additional contact members. In this way, an additional microphone in the pickup unit, e.g. as part of a system for providing a directionally sensitive microphone system may be achieved, while maintaining full rotational freedom between the pickup unit and the housing. Naturally, even more microphones or other components requiring electrical connection may be added to the pickup unit and be electrically connected to an electronic circuit in the housing by additional connections in the sliding contact.

In another embodiment, the annular ring is formed in segments and comprises a number of isolated segments, the isolated segments being electrically isolated from a remainder of the segmented annular ring, the number of isolated segments corresponding to the number of contact members, wherein the isolated segments are arranged to communicate with the contact members when the sliding contact is in a special position. In this way, the sliding contact is adapted to enable a special function, such as a muting function, when the contact is in the special position. For contacts comprising a second or any additional annular rings, such annular rings may of course also be formed in segments and comprise isolated segments. Advantageously, the sliding contact should be adapted to disconnect both connections to the microphone, in order to prevent noise from being picked up by the circuit.

In another embodiment, the annular ring is formed in segments and comprises a number of isolated segments, the isolated segments being electrically isolated from a remainder of the segmented annular ring, the number of isolated segments corresponding to the number of contact members, wherein the isolated segments are arranged to communicate with the contact members when the sliding contact is in a special position. In this way, the sliding contact is adapted to enable a special function, such as a muting function, when the contact is in the special position. For contacts comprising a second or any additional annular rings, such annular rings may of course also be formed in segments and comprise isolated segments. Advantageously, the sliding contact should be adapted to disconnect both connections to the microphone, in order to prevent noise from being picked up by the circuit. This disconnection of the microphone can be done by breaking circuit connections mechanically, or by detecting the electrical noise created when contacts are slid along a conductor and then electronically blocking or squelching the microphone output during the noisy period. Likewise any electrical noise created by contact movement during rotation can be electronically blocked, squelched (by raising the threshold for signals to be passed through) or suppressed, such as by using phase shifted sound suppression techniques.

In another embodiment, the isolated segments are electrically connected to a special circuit adapted for providing special functions. In this way, the sliding contact acts as a switch between the electronic circuit for normal operation, and the special circuit for the special function. For example, the special function may be to turn the headset off, to set a flag, e.g. "away" or "do-not-disturb", in a softphone client to which the headset is connected, to change the state of a phone to which the headset is connected to off-hook, etc. Note that the special circuit may be a sub-circuit of the electronic circuit of the headset housing, or may otherwise be connected thereto. Here, the isolated segments are merely isolated from a remainder of the corresponding annular ring in the sense that they are not directly connected via the annular ring, but may, e.g. be connected via a the special circuit. Naturally, any isolated segments corresponding to annular rings besides the first annular ring may also be connected to the special circuit or to additional special circuits.

According to another aspect of the disclosure there is described a headset for voice communication having a housing, an earphone, and a pickup unit rotatably connected to the housing via a joint. The pickup unit including at least a first microphone. The first microphone being electrically connected via at least a first electrical connection to an electronic circuit for processing signals from the first microphone the electronic circuit being arranged in the housing. The headset unit having circuitry for performing at least one predetermined function. A position sensor associated with the pickup unit capable of producing an output corresponding to the position of the unit. Circuitry responsive to said output for engaging said at least one predetermined function of the headset when the pickup unit is detected in a predetermined position, and for generating an audible signal to user via the earphone indicating the activation of said function.

According to another aspect of the disclosure there is described a position sensor includes, a two part housing, one part including the earphone and the other including the pick up unit; with a first electrical connection in one part of the housing comprises a first sliding contact rotatable about a rotational axis and a first annular ring in the other part of the housing, arranged so that the ring is positioned around the rotational axis and aligned to be in sliding contact with said first electrical connection, so as to provide an electrical connection between the first annular ring and the contact members; with the at least a portion of said annular ring being electrically segmented to provide different electrical signals a different positions of said sliding contact, thereby indicating the position of the pickup unit.

According to another aspect of the disclosure there is described a headset wherein said pickup unit further includes the capability of swinging outwardly and inwardly from the user and wherein said position sensor can detect such movement.

According to another aspect of the disclosure there is described a pickup unit further includes the capability of rotating axially and wherein said position sensor can detect such movement.

According to another aspect of the disclosure there is described a function mutes a microphone connection and where movement of the unit to said predetermined position activates the mute function and sends an audible message to the earphone that the microphone mute is on.

According to another aspect of the disclosure there is described a swing out pivot and a second position sensor which produces an output responsive to the swing out pivot's position and wherein a predetermined position of the swing out arm activates a predetermined function.

According to another aspect of the disclosure there is described a rotatable coupling and a third position sensor in said coupling which produces an output responsive to the coupling's position and wherein a predetermined position of the coupling activates a predetermined function.

According to another aspect of the disclosure there is described a position sensor includes a mechanical position detector comprising a sliding contact (20, 70) further comprises at least a second annular ring (51), and the other of the housing side comprises a plurality of second contact members (30) arranged in a second radial distance from the rotational axis (26) so as to provide a second electrical connection between the second annular ring (51) and the second contact members (30).

According to another aspect of the disclosure there is described a first annular ring (50) and the second annular ring (51) are arranged concentrically around the rotational axis (26).

According to another aspect of the disclosure there is described at least two of the contact members (30) are electrically connected in parallel for providing parallel electrical connections between the first annular ring (50) and contact members (30).

According to another aspect of the disclosure there is described a sliding contact, at least a first and a second contact member (30) connected in parallel are arranged to extend from the second plane towards the first plane at oblique angles, such that the first contact member (30) extends in the direction of rotation, and that the second contact member (30) extends opposite to the direction of rotation.

According to another aspect of the disclosure there is described contact members (30) which are resiliently biased or spring-loaded towards the first annular ring (50).

According to another aspect of the disclosure there is described contact members (30) are arranged on a contact wheel (21), which is mechanically engaged with either the pickup unit (8) or the housing (2).

According to another aspect of the disclosure there is described a pickup unit (8) comprises at least a second microphone, and wherein the housing side or the microphone side of the sliding contact (20, 70) comprises at least one additional annular ring (50), and wherein the other of the microphone side or the housing side of the sliding contact (20, 70) comprises a number of additional contact members (30) so as to provide an electrical connection between the additional annular ring (50) and the additional contact members (30).

According to another aspect of the disclosure there is described wherein the annular ring (72) is formed in segments and comprises a number of isolated segments (76), the isolated segments (76) being electrically isolated from a remainder of the segmented annular ring (72), the number of isolated segments (76) corresponding to the number of contact members (30), wherein the isolated segments (76) are arranged to communicate with the contact members (30) when the sliding contact (70) is in a special position.

According to another aspect of the disclosure there is described wherein the isolated segments (76) are electrically connected to a special circuit adapted for providing a special function.

According to another aspect of the disclosure there is described an earphone, and a pickup unit rotatably connected to the housing via a joint, the pickup unit including at least a first microphone, the first microphone being electrically connected via at least a first electrical connection to an electronic circuit for processing signals from the first microphone, the electronic circuit being arranged in the housing, wherein said headset unit having circuitry for performing at least one predetermined function; a position sensor associated with the pickup unit capable of producing an output reporting the position of the unit audio signal level detection circuitry capable of determining an optimal microphone audio amplitude level, said circuitry being coupled to said position sensor, and wherein said one predetermined function is a warning to the user that the amplitude is out of said optimal level by issuing a voice prompt in the earphone advising the user to move the microphone closer or farther from the user to achieve said optimal level.

According to another aspect of the disclosure there is described a method of activating functions in a headset having a movable microphone boom arm and a earphone comprising the steps of defining at least one headset function based on a position of the boom arm, detecting when the boom arm is in said at least one defined position activation said function when said boom arm is in said at lest one defined position, d. audibly announcing the activation of said function to a user via the earphone.

According to another aspect of the disclosure there is described the step of:
defining multiple positions of the boom arm and assigning different function to each position.

According to another aspect of the disclosure there is described a method detecting the position of the boom arm by detecting differences in electrical signals generated at different positions thereof.

According to another aspect of the disclosure there is described a method of detecting of ratcheting action of the boom arm to activate a predetermined function for each ratchet.

This summary is not intended to define the scope of the invention. That is done by the claims. It is only to assist the reader in preparing for review the figures and detailed description which follows.

BRIEF DESCRIPTION OF DRAWINGS

The disclosure is explained in detail below with reference to the drawing, in which.

DETAILED DESCRIPTION

Figure 1:
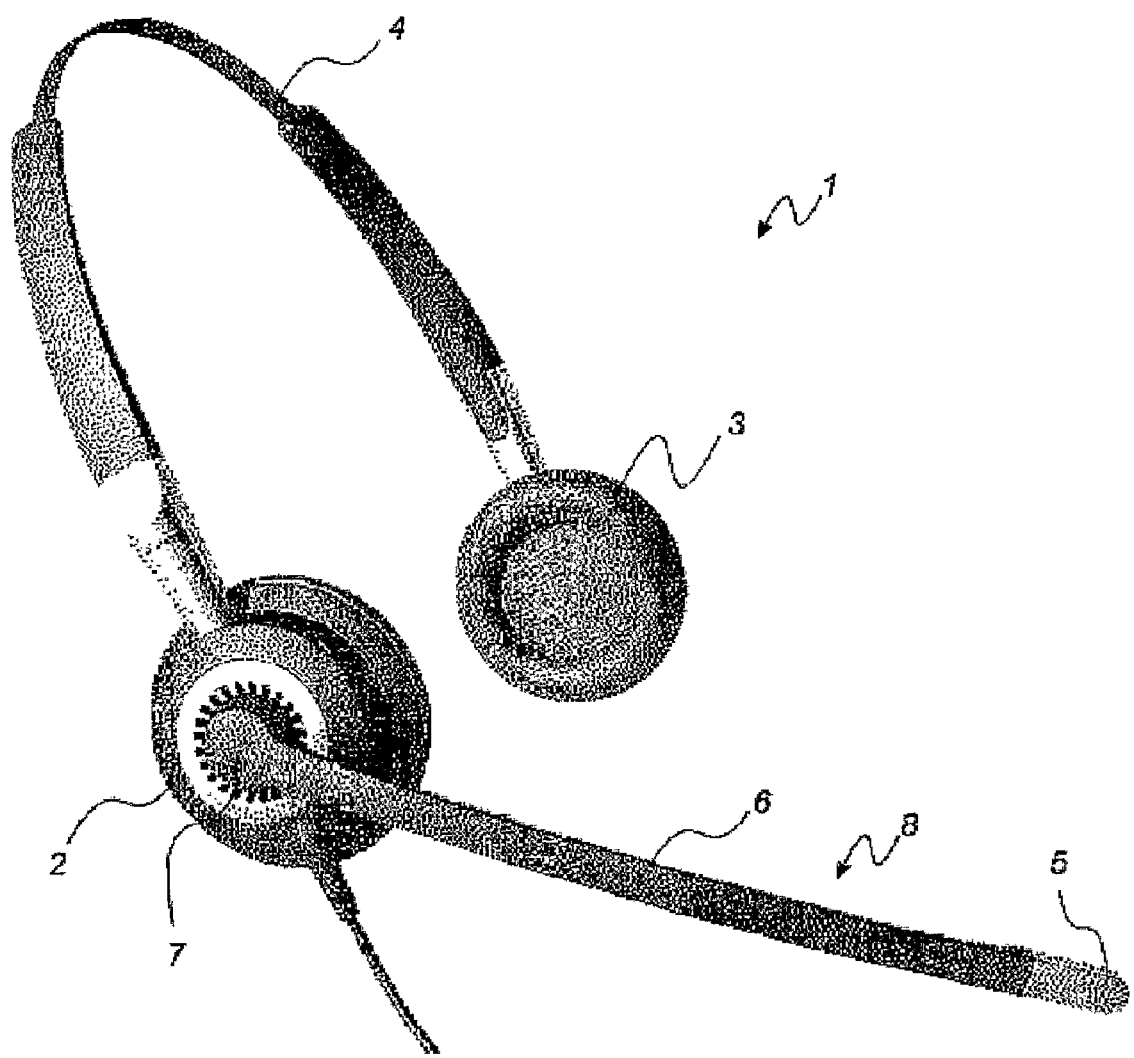
FIG. 1 shows an overview of a headset according to the disclosure.

A headset 1 for voice communication is illustrated in FIG. 1. The headset 1 comprises an earphone housing 2 and, optionally, a second earphone housing 3 including an earphone (one or both ears), which are interconnected and held in place on the head of a user by a head band 4. A microphone 5 is mounted on a pickup unit in form of a microphone boom 6, which is rotatably connected to the earphone housing 2 via joint 7.

Figure 2:
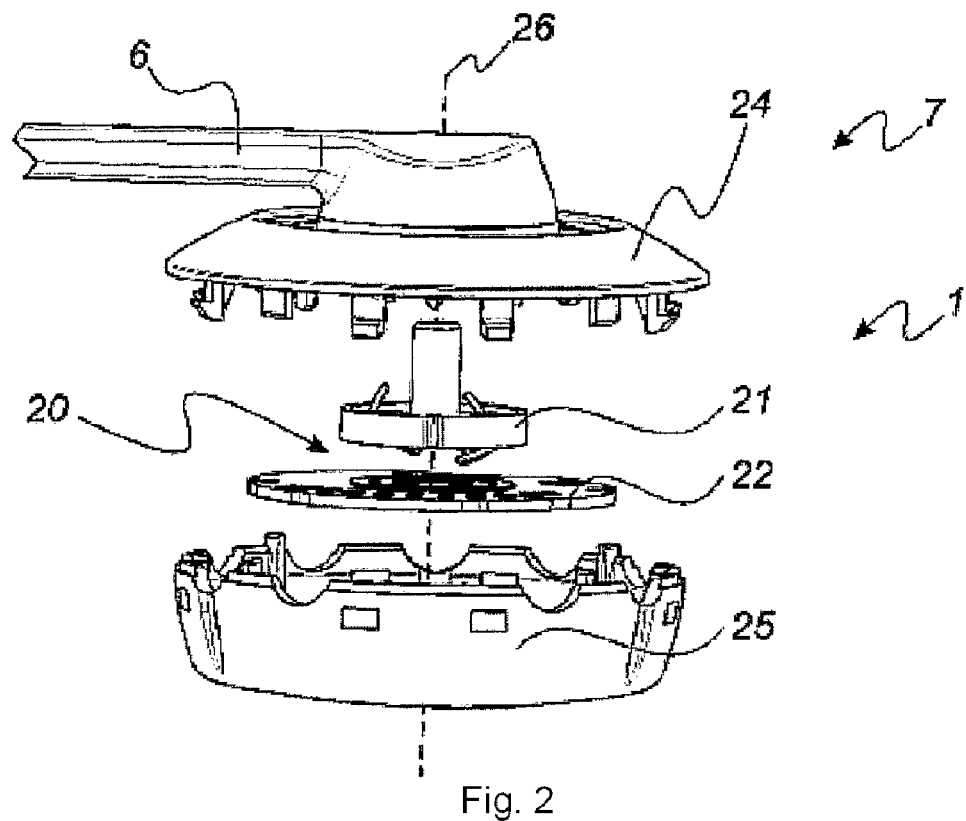
FIG. 2 shows an enlarged exploded view of a joint of a headset according to the disclosure.

An exploded view of the housing 2 comprising a rotatable joint 7 is illustrated in FIG. 2. As can be seen, the rotatable joint comprises a sliding contact 20. The sliding contact 20 comprises a contact wheel 21 on a microphone side and a printed circuit board 22 (PCB) on a housing side of the sliding contact between the two housing covers 24, 25. The microphone boom 6 and the housing are mutually rotatable about a rotational axis 26 indicated with a dashed line in the figure. In one embodiment, the PCB 22 further comprises most of the components of the electronic circuit contained in the headset 1, or, in other words, the PCB 22 is the main board of the headset 1. Alternatively, one or more additional printed circuit boards may be comprised in the headset 1.

Figure 3:
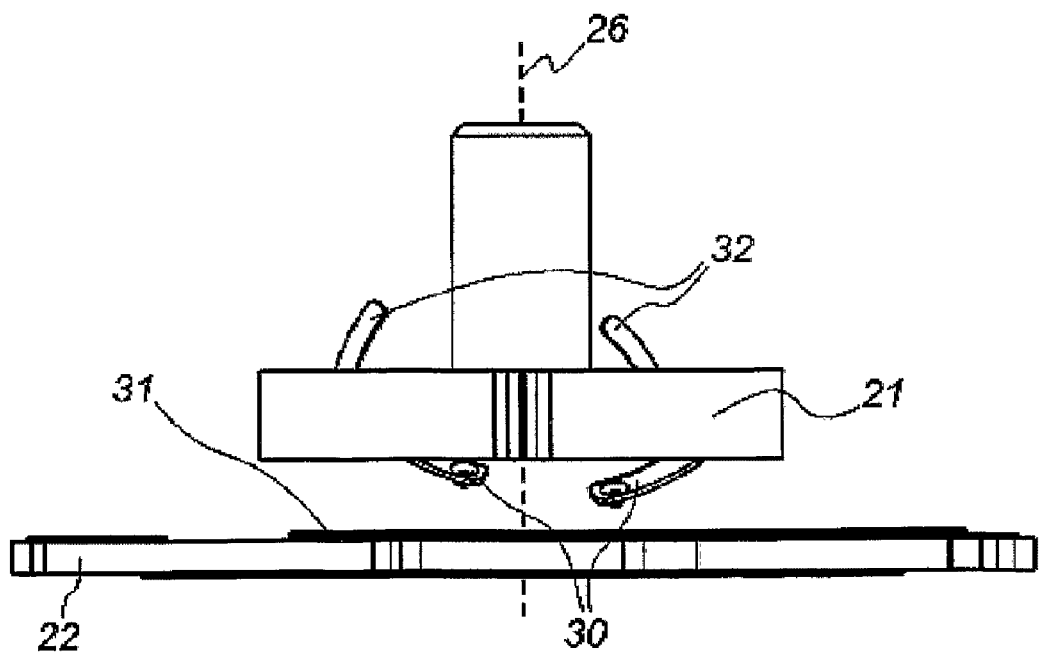
FIG. 3 shows an embodiment of a sliding contact according to the disclosure.

FIG. 3 depicts a schematic and exploded view of the sliding contact, showing the contact wheel 21 and PCB 22 in detail. The contact wheel 21 is here illustrated with two contact members 30 arranged in different radial distances from the rotational axis 26 corresponding to two different annular rings 31 on the PCB 22. However, more than one contact member 30 may be arranged to correspond with the same annular ring 31, to provide multiple, parallel electrical connections. Likewise, any number of annular rings 31 may be arranged on the PCB 22, such as one, two, three, four, or even more annular rings depending on the number of electrical connections required through the joint 7. To complete the electronic connection between the contact members 30 and the microphone 5, the contact wheel 21 further comprises a number of connection flanges 32, which are connected electrically to the contact members 30. The microphone 5 is then connected by wire or other means to the connection flanges 32, e.g. by a soldered, welded or force-fitted connection. In the embodiment shown in FIG. 2, the contact wheel 21, which comprises the contact members 30, is fixated to the microphone boom 6 on the microphone side of the sliding contact. The PCB 22, which comprises one or more annular rings 31, is fixated within the housing 2 on the housing side of the sliding contact. However, the opposite configuration with contact members fixated to the housing and an arrangement of annular rings fixated to the microphone boom may also be envisioned.

Figure 4:
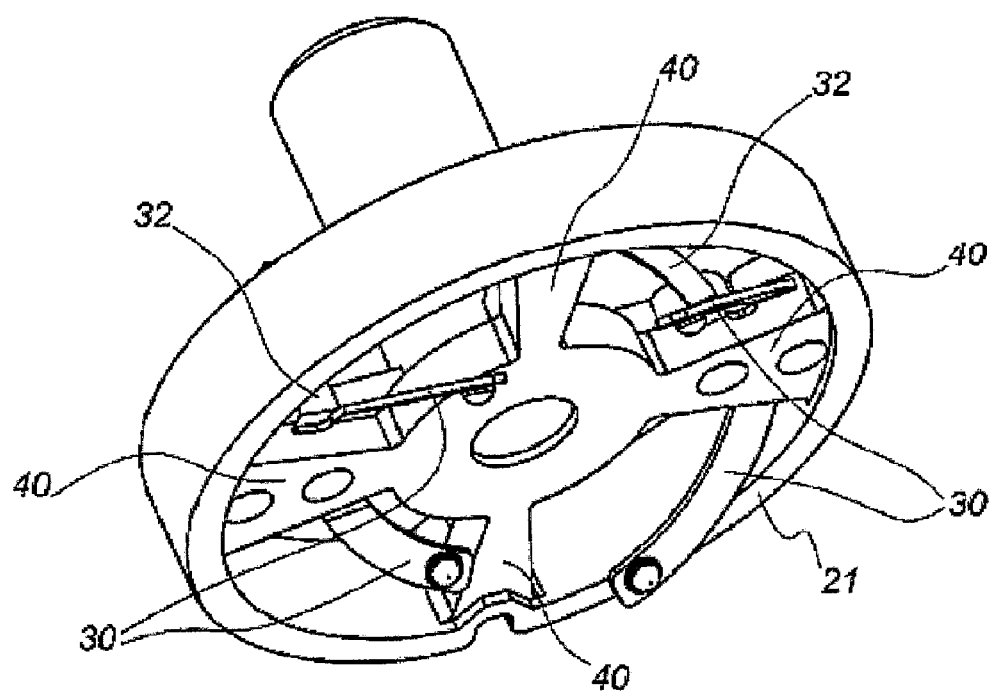
FIG. 4 shows an embodiment of a contact wheel according to the disclosure.

FIG. 4 shows an embodiment of a contact wheel 21 comprising two groups of contact members 30, each mounted on a spoke 40 of the wheel. According to this embodiment, each group comprises two contact members 30, extending in opposite directions from the spoke 40 along the direction of rotation. In this way, one contact member of each group is always pulled along the annular ring and one is always pushed, regardless of the rotation direction. A contact member 30 being pushed may skip over the surface of the annular ring 50, thus breaking the electrical connection. Therefore, it is advantageous to ensure that one contact member 30 is always pulled, to improve the quality of the electrical connection between the two sides of the sliding contact 7. Preferably, the connection flange 32 is unitarily formed with its one or more corresponding contact members 30, e.g. by punching, stamping, or cut-out of a plate of suitable material. The contact members 30 may be made to be resilient in the direction along the rotational axis 26. Alternatively, contact members 30 may be mounted to the contact wheel 21 by spring-loaded mounting means to allow for some travel of the contact member tip in the axial direction. The contact wheel 21 may e.g. be unitarily formed in a polymer material by common processes, such as casting or moulding. Furthermore, contact members 30 and connection flanges 32 may be cast into the contact wheel 21 during production, thus yielding a particularly simple assembly of the part.

Figure 5:
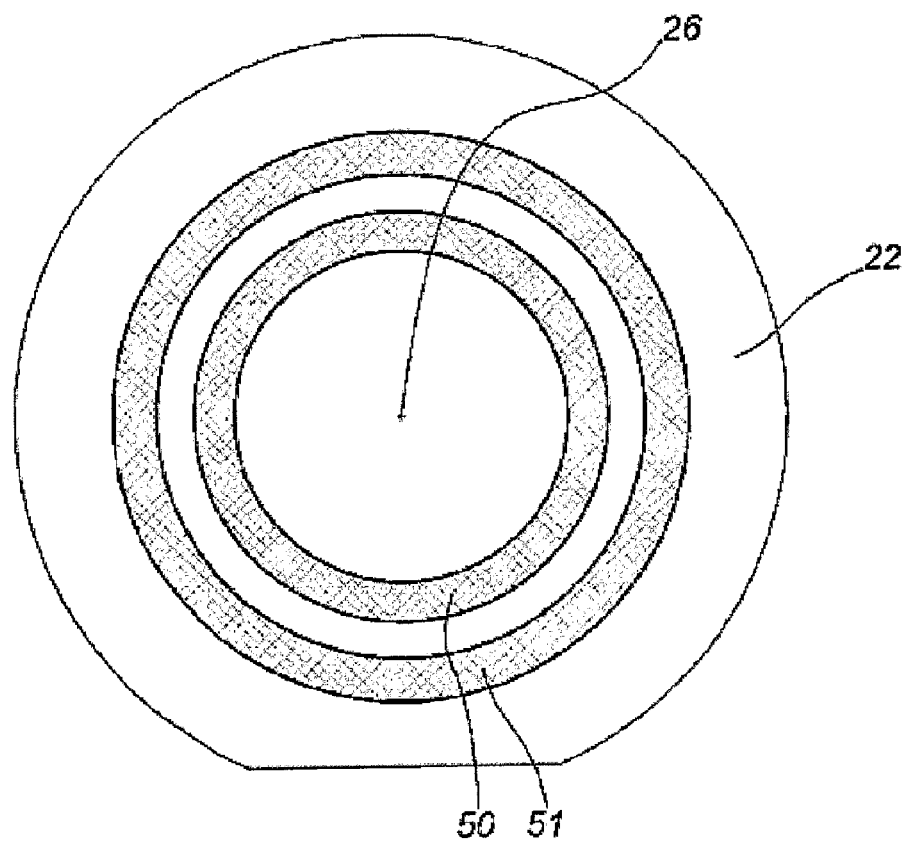
FIG. 5 shows an embodiment of one side of a sliding contact according to the disclosure, comprising two annular rings.

FIG. 5 shows two annular rings 50, 51 arranged on a PCB 22. Each of the two annular rings 50, 51 are connected to the electronic circuit in the headset housing 2. In one embodiment, the connection between an annular ring and the circuit is formed directly as a PCB track, possibly on the opposite side of a dual-side PCB. Alternatively, a connection may be formed by a wire. In the embodiment shown in FIG. 5, the annular rings 50, 51 describe a full circle around the rotational axis 26. In an alternative embodiment as described further below, one or more annular rings are arranged to have regions that allow the electrical connection across the sliding contact to be either short-circuited or broken when the pickup unit is oriented in specific directions. In this way, e.g. a mechanical muting function/mode may be built into the headset.

Figure 6:
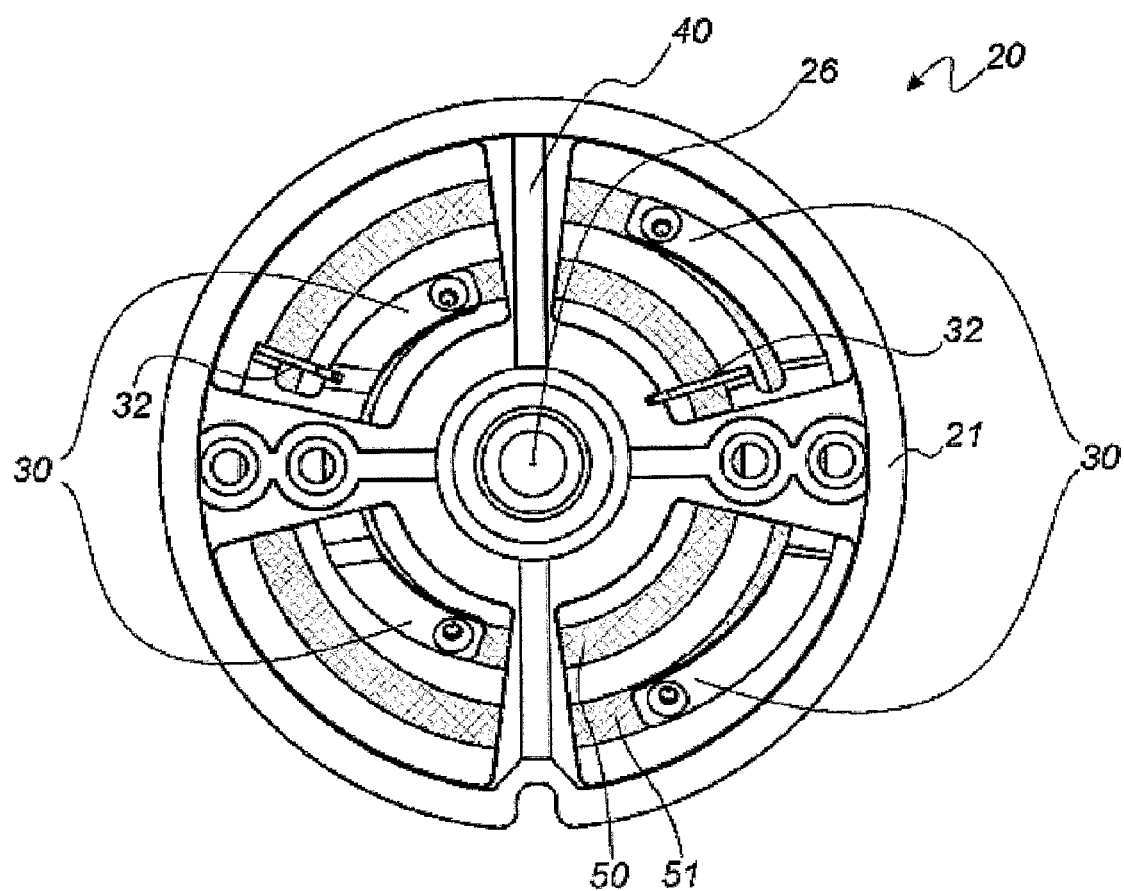
FIG. 6 shows a contact wheel engaged with two annular rings according to the disclosure.

FIG. 6 shows the sliding contact 20 as seen in the axial direction. The contact comprises a contact wheel 21 engaged with two annular rings 50. To achieve a noise-free transmission of the audio signal through the contact, both the contact members 30 and the annular rings 50 are preferably made with gold surfaces, at least where they become engaged. For example, the contact members and/or annular rings may be made, e.g., of copper which is subsequently gold-plated. Alternatively, the contact members and/or annular rings may be made in solid gold. The contact members 30 are fixed to the spokes 40 of the contact wheel 21.

Figure 7:
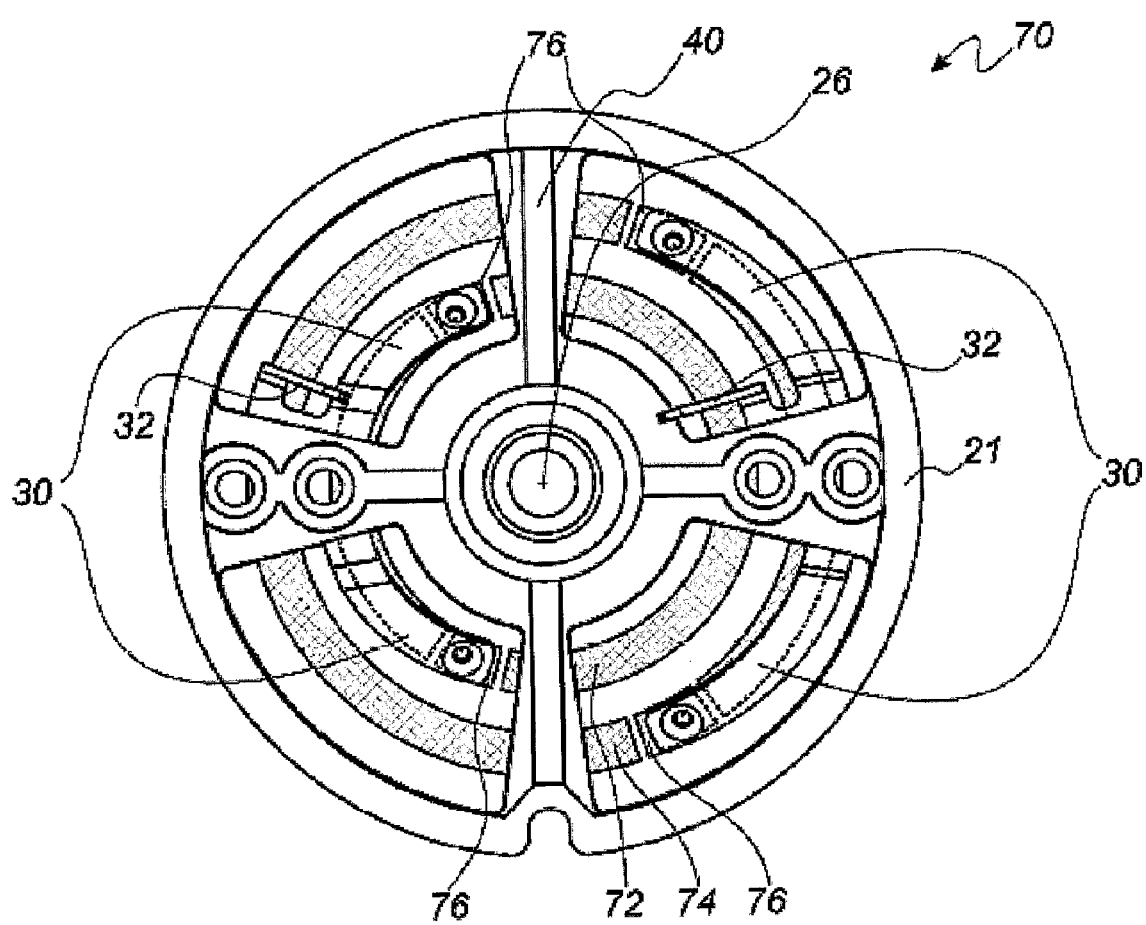
FIG. 7 shows a contact wheel engaged with two annular rings according to another embodiment of the disclosure.

FIG. 7 shows an alternative sliding contact 70, corresponding to the embodiment shown in FIG. 6. Therefore, only differences between the two embodiments are discussed here. The sliding contact 70 is adapted to provide a special function when oriented in a special position. The annular ring 72 and second annular ring 74 are formed in segments, each ring 72, 74 further having a number of isolated segments 76. Here, the rings are shown to each have two isolated segments, corresponding to the number of contact members 30 in a group. The two major segments of the segmented annular ring 72 are preferably connected (not shown) to ensure a parallel connection between the two sides of the sliding contact, except when in the special position. The same applies to the second segmented annular ring 74. Furthermore, the isolated segments 76 are aligned so that all contact members 30 of the sliding contact 70 may simultaneously touch their corresponding isolated segment 76, whereby neither of the annular rings 72, 74 are in contact with the contact members 30. Note that the isolated segments 76 are merely isolated from their corresponding annular ring 72, 76, but may otherwise be connected to an electronic circuit. In this way, the sliding contact 70 may execute various special functions when the sliding contact 70 is aligned to the isolated segments 76. For example, a special function may be to mute the microphone, to power off the headset, to set e.g. a "do not disturb" or "away" flag in a softphone client to which the headset is connected, etc Some examples for additional functions or modes which can be made position responsive are:

a) accept/reject call mode (f. example microphone boom arm away, means reject calls),
b) voice communication mode off (f. ex. boom arm upward or away from user's mouth means turn off voice communication music listening mode only on, (f. ex. boom arm away accepts music input until a voice call comes in at which time the user is prompted to bring the mic closer to mouth),
c) change bandwidth voice/music (f. ex. boom arm up activates wide dynamic range wireless bandwidth for music while boom near mouth switches to narrow band power saving mode);
d) change to power saving mode (f. ex. lower bandwidth, put headset into hibernation/sleep/other power saving mode after x minutes, in response to twisting mic boom away from user)
e) change of microphone sensitivity (f. ex. moving the mic away triggers increased mic sensitivity or "conference room" mode); unidirectional mic function vs. omnidirectional mode (f. ex. moving mic closer for uni farther for omni);
f) switching in second or more mics (f. ex moving boom upward switches to second, or adds second mic which operates in group mode);
g) active noise cancelling mode ANC. ON (f. ex. ratcheting boom up switched ANC on for noisy environments), etc.

It is evident to the person skilled in the art that a multitude of special positions may be provided, to enable one or more special functions in said positions.

One of the problems with headsets with multiple electronic functions is that the user has no readily visible display to report the current functional state in which the headset is operating, because the headset is necessarily out of the users view when placed on the head. Typically switches are mounted on the headset and the user can depress them to select a function, but the switches are likewise out of the view of the wearer.

To overcome this problem it is possible to utilize the boom position to select functions. Furthermore, the selected functions can be reported to the user audibly thru the speaker.

As shown in FIG. 1, boom 6 is rotatable 360 degrees. Such booms may also have the ability to further degrees of movement. For example, the boom may also pivot laterally, i.e. inwardly and outwardly with respect to the user's cheek, as shown in U.S. Pat. No. 7,181,037 which is hereby incorporated by reference.

Combining rotational and lateral movement, it can be seen that the boom can be positioned in a wide range of orientations, yet only a few of them are important for sound capture. The rest many be utilized for other functions. For example, the position "boom up" i.e. boom pointing upward is not useful for speech capture, likewise "boom down", boom swung away from cheek" etc., are positions not useful for speech capture and can be used for other functions. Likewise for positions between boom close to mouth and boom up/down are less usable for speech.

So by detecting the position of the boom along the axis of rotation or in case of the swing out boom, angular displacement from a position maximally close to the user's cheek, the system can be programmed to detect position (or detect movement toward or away from such position), change the headset to such function and report the change to the user by spoken voice or signal in the user's ear.

Furthermore, if the speech processor detects that the voice capture level is too/high (over-modulation) or ambient noise is too high, it can provide the user with a voice prompt telling the user to move the microphone close to the mouth, because the system now knows the exact position of the boom. Thus the headset can warn the user if the boom is not positioned correctly.

So, for example if the user wishes to mute the microphone, he/she might move the boom vertically, (boom up) or laterally away from the mouth (boom away). The position sensor in the boom will detect the new position, switch off the microphone and audibly report "mic muted" in the user's ear. Optionally, the "mic muted phrase may be periodically repeated to the user.

Likewise, merely moving the boom up or away can be programmed to control hear-piece volume or other function. For example ratcheting (back and forth movement) of the boom up, down, in or out, may be program to raise or lower the earpiece volume. So the position sensor can be programmed to detect movement, speed of movement, and or direction of movement to trigger functions and report them audibly to the user.

Position sensing may be accomplished by the isolated segments solution provided above. The annular ring is formed in segments and comprises a number of isolated segments, the isolated segments being electrically isolated from a remainder of the segmented annular ring, the number of isolated segments corresponding to the number of contact members, wherein the isolated segments are arranged to communicate with the contact members when the sliding contact is in a special position. In this way, the sliding contact is adapted to enable a special function, such as a muting function, when the contact is in the special position. For contacts comprising a second or any additional annular rings, such annular rings may of course also be formed in segments and comprise isolated segments. Advantageously, the sliding contact should be adapted to disconnect both connections to the microphone, in order to prevent noise from being picked up by the circuit. This disconnection of the microphone can be done by breaking circuit connections mechanically, or by detecting the electrical noise created when contacts are slid along a conductor and then electronically blocking or squelching the microphone output during the noisy period. Likewise any electrical noise created by contact movement during rotation can be electronically blocked, squelched (by raising the threshold for signals to be passed through) or suppressed, such as by using phase shifted sound suppression techniques.

In another embodiment, the isolated segments are electrically connected to a special circuit adapted for providing special functions. In this way, the sliding contact acts as a switch between the electronic circuit for normal operation, and the special circuit for the special function. For example, the special function may be to turn the headset off, to set a flag, e.g. "away" or "do-not-disturb", in a softphone client to which the headset is connected, to change the state of a phone to which the headset is connected to off-hook, etc. Note that the special circuit may be a sub-circuit of the electronic circuit of the headset housing, or may otherwise be connected thereto. Here, the isolated segments are merely isolated from a remainder of the corresponding annular ring in the sense that they are not directly connected via the annular ring, but may, e.g. be connected via a the special circuit. Naturally, any isolated segments corresponding to annular rings besides the first annular ring may also be connected to the special circuit or to additional special circuits.

In the swing out boom construction as in U.S. Pat. No. 7,818,037, mechanical position sensing is also possible by having the moving boom portion include a contact which wipes across a linear or curved plate contact (similar to the annular ring above, but curved to follow the arcuate path of the swing arm boom).

Figure 8:
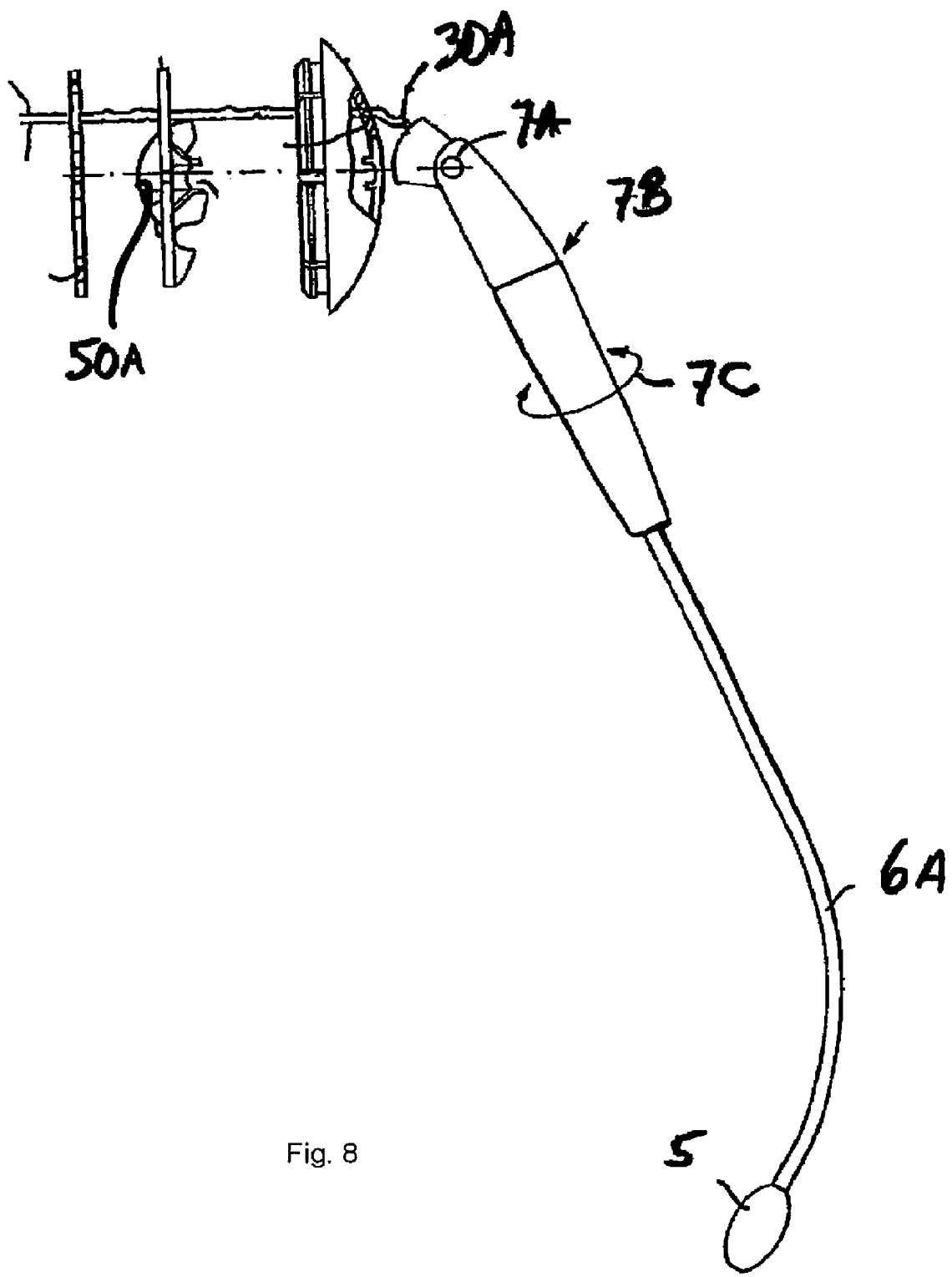
FIG. 8 shows an additional feature combinable with other embodiments, with a swing out arm pivot.

FIG. 8 illustrates a swing out arm with a microphone boom 6a with a further rotatable coupling or joint 7B which rotates as shown in 7C. An annular ring contact plate and sliding contact similar to shown above may be included to detect position although other means of rotation sensing are possible. Likewise, the pivot 7A may have a sliding contact 30A which engages an arcuate or concave ring contact 50A, preferably segmented to detect position.

The swing out arm of FIG. 8 would then be combinable with the boom rotational mechanism above to provide multiple axes of movement and consequently, many available detectable positions which can be used to activate headset functions, which are then preferably reported to the user audibly.

While position sensing has been described in terms of electrical contacts with segments, it is possible to detect position in may other ways such as, but not limited to, a) resistive, capacitive, inductive or semiconductor coatings or conductors which varying characteristics along their path (f. ex. changes in resistance which translate into position information) b) position sensors which report position relative to gravity, c) inertial sensors which detect movement and its direction, speed, acceleration, etc, d) magnet field sensors, which measure changes in field strength of a permanent magnet whose proximity is changed, and other position sensing devices currently known in the art or which may be developed later.

The disclosure has been described with reference to preferred embodiments. Many modifications are conceivable without thereby deviating from the scope of the invention. Modifications and variation obvious to those skilled in the art are considered to fall within the scope of the present invention. For example, the contact members do not need to be arranged on a separate contact wheel, but may instead be arranged directly on the housing. Likewise, the annular rings do not need to be arranged on a printed circuit board, but may be arranged on any other suitable carrying structure, such as an integrated part of the housing. In addition, the headset may take many forms, e.g. by having only one earphone, having a neckband or any other suitable means of fastening the device to the user, besides the headband described here. Also, the microphone side of the sliding connection may comprise one annular ring and a set of contact members, which engage with contact members and an annular ring, respectively, on the housing side of the sliding connection.

REFERENCE NUMERAL LIST 1 headset
2 earphone housing
3 second earphone housing
4 head band
5 microphone
6 microphone boom
7 rotatable joint
8 pickup unit
20 sliding contact
21 contact wheel
22 printed circuit board (PCB)
24 first housing cover
25 second housing cover
26 rotational axis
30 contact member
31 annular ring
32 connection flange
40 spoke
50 first annular ring
51 second annular ring
70 sliding contact
72 segmented annular ring
74 second segmented annular ring
76 isolated segment
6A boom 7A pivot
7B rotatable coupling
7C indication of rotation
30A contact
50A annular contact ring (preferably segmented)

The invention claimed is:

1. A headset for voice communication comprising
a housing, an earphone, and a pickup unit rotatably connected to the housing via a joint,
   the pickup unit including at least a first microphone,
   the first microphone being electrically connected via at least a first electrical connection to an electronic circuit for processing signals from the first microphone the electronic circuit being arranged in the housing,
   said headset unit having circuitry for performing at least one predetermined function;
   a position sensor associated with the pickup unit capable of producing an output corresponding to the position of the unit
   circuitry responsive to said output for engaging said at least one predetermined function of the headset when the pickup unit is detected in a predetermined position, and for generating an signal to user via the earphone indicating the activation of said function.

2. A headset according to claim 1 wherein the position sensor includes, a two part housing, one part including the earphone and the other including the pick up unit;
   a first electrical connection in one part of the housing comprises a first sliding contact rotatable about a rotational axis and,
   a first annular ring in the other part of the housing, arranged so that the ring is positioned around the rotational axis and aligned to be in sliding contact with said first electrical connection, so as to provide an electrical connection between the first annular ring and the contact members;
   said at least a portion of said annular ring being electrically segmented to provide different electrical signals a different positions of said sliding contact, thereby indicating the position of the pickup unit.

3. A headset according to claim 1 wherein said pickup unit further includes the capability of swinging outwardly and inwardly from the user and wherein said position sensor can detect such movement.

4. A headset according to claim 1 wherein said pickup unit further includes the capability of rotating axially and wherein said position sensor can detect such movement.

5. Headset according to claim 1 wherein said function mutes a microphone connection and where movement of the unit to said predetermined position activates the mute function and sends an audible message to the earphone that the microphone mute is on.

6. Headset according to claim 1 wherein said unit further rotatable coupling and a third position sensor in said coupling which produces an output responsive to the coupling's position and wherein a predetermined position of the coupling activates a predetermined function.

7. Headset according to claim 1 wherein said position sensor includes a mechanical position detector comprising a sliding contact further comprises at least a second annular ring, and the other of the housing side comprises a plurality of second contact members arranged in a second radial distance from the rotational axis so as to provide a second electrical connection between the second annular ring and the second contact members.

8. Headset according to claim 7 wherein the first annular ring and the second annular ring are arranged concentrically around the rotational axis.

9. Headset according to claim 8, wherein at least two of the contact members are electrically connected in parallel for providing parallel electrical connections between the first annular ring and contact members.

10. Headset according to claim 7 wherein under rotation of the sliding contact, at least a first and a second contact member connected in parallel are arranged to extend from the second plane towards the first plane at oblique angles, such that the first contact member extends in the direction of rotation, and that the second contact member extends opposite to the direction of rotation.

11. Headset according claim 9, wherein the contact members are resiliently biased or spring-loaded towards the first annular ring.

12. Headset according to claim 11, wherein the contact members are arranged on a contact wheel, which is mechanically engaged with either the pickup unit or the housing.

13. Headset according to claim 7, wherein the pickup unit comprises at least a second microphone, and wherein the housing side or the microphone side of the sliding contact comprises at least one additional annular ring, and wherein the other of the microphone side or the housing side of the sliding contact comprises a number of additional contact members so as to provide an electrical connection between the additional annular ring and the additional contact members.

14. Headset according to claim 7, wherein the annular ring is formed in segments and comprises a number of isolated segments, the isolated segments being electrically isolated from a remainder of the segmented annular ring, the number of isolated segments corresponding to the number of contact members, wherein the isolated segments are arranged to communicate with the contact members when the sliding contact is in a special position.

15. Headset according to claim 1, wherein the isolated segments are electrically connected to a special circuit adapted for providing a special function.

16. A headset for voice communication comprising
a housing, an earphone, and a pickup unit rotatably connected to the housing via a joint,
   the pickup unit including at least a first microphone,
   the first microphone being electrically connected via at least a first electrical connection to an electronic circuit for processing signals from the first microphone, the electronic circuit being arranged in the housing, wherein
   said headset unit having circuitry for performing at least one predetermined function;
   a position sensor associated with the pickup unit capable of producing an output reporting the position of the unit,
   audio signal level detection circuitry capable of determining an optimal microphone audio amplitude level, said circuitry being coupled to said position sensor, and wherein said one predetermined function is a warning to the user that the amplitude is out of said optimal level by issuing a voice prompt in the earphone advising the user to move the microphone closer or farther from the user to achieve said optimal level.

17. A method of activating functions in a headset having a movable microphone boom arm and a earphone comprising the steps of:
   a. defining at least one headset function based on a position of the boom arm, b. detecting when the boom arm is in said at least one defined position,
c. activation said function when said boom arm is in said at least one defined position,
d. audibly announcing the activation of said function to a user via the earphone.

18. The method of claim 17 further including the step of:
defining multiple positions of the boom arm and assigning different function to each position.

19. The method of claim 17 further including detecting the position of the boom arm by detecting differences in electrical signals generated at different positions thereof.

20. The method of claim 17 further including detecting of ratcheting action of the boom arm to activate a predetermined function for each ratchet.

* * * * *